US012759090B2

(12) United States Patent
Krutzke et al.

(10) Patent No.: US 12,759,090 B2
(45) Date of Patent: Oct. 13, 2026

(54) LASER CUTTING METHOD

(71) Applicant: TRUMPF Werkzeugmaschinen SE + Co. KG, Ditzingen (DE)

(72) Inventors: Michael Krutzke, Sindelfingen (DE); Patrick Mach, Korb (DE); Christoph Kraus, Renningen (DE)

(73) Assignee: TRUMPF Werkzeugmaschinen SE + Co. KG, Ditzingen (DE)

( * ) Notice: Subject to any disclaimer, the term of this patent is extended or adjusted under 35 U.S.C. 154(b) by 858 days.

(21) Appl. No.: 18/187,821

(22) Filed: Mar. 22, 2023

(65) Prior Publication Data

US 2023/0219174 A1 Jul. 13, 2023

Related U.S. Application Data

(63) Continuation of application No. PCT/EP2021/075299, filed on Sep. 15, 2021.

(30) Foreign Application Priority Data

Sep. 25, 2020 (DE) ..................... 10 2020 212 088.9

(51) Int. Cl.
*B23K 31/10* (2006.01)
*B23K 26/08* (2014.01)
(Continued)

(52) U.S. Cl.
CPC .......... *B23K 31/10* (2013.01); *B23K 26/0869* (2013.01); *B23K 26/1462* (2015.10); *B23K 26/38* (2013.01)

(58) Field of Classification Search
CPC ................ B23K 31/10; B23K 26/0869; B23K 26/1462; B23K 26/38; B23K 26/14; B23K 26/1476
See application file for complete search history.

(56) References Cited

U.S. PATENT DOCUMENTS 5,466,909 A 11/1995 Nihei et al.
6,100,498 A 8/2000 Nakata
(Continued)

FOREIGN PATENT DOCUMENTS

DE 102012219074 A1 4/2014
DE 102014206358 A1 10/2015
(Continued)

OTHER PUBLICATIONS

Bliedtner, et al. "Lasermaterialbearbeitung", Grundlagen—Verfahren—Anwendungen—Beispiele, 2013 Carl Hanser Verlag, May 17, 2018 ("Laser Material Processing, Basics—Methods—Applications—Examples").

*Primary Examiner* — Robert G Bachner
(74) *Attorney, Agent, or Firm* — Laurence A. Greenberg; Werner H. Stemer; Ralph E. Locher

(57) ABSTRACT

In a method for laser fusion cutting in particular a plate-shaped workpiece, preferably with a thickness D of at least 1 mm, a laser beam and a cutting gas, in particular nitrogen, at a cutting gas pressure are directed at the workpiece surface by a convergent cutting nozzle. The laser power is at least 6 kW and the cutting nozzle has a nozzle end face on the workpiece side. A distance A between the nozzle end face and the workpiece surface during the cutting operation is 2 to 8 mm. The cutting nozzle has a nozzle channel with a diameter $d_D$ at the nozzle end face on the workpiece side of 1.5 to 4 mm. The cutting gas pressure before emergence from the cutting nozzle is 15 to 30 bar. This makes it possible to achieve high productivity along with a reduced risk of collision, i.e. higher process reliability.

15 Claims, 3 Drawing Sheets

(51) Int. Cl.
*B23K 26/14* (2014.01)
*B23K 26/38* (2014.01)

(56) References Cited

U.S. PATENT DOCUMENTS

| | | | | |
|---|---|---|---|---|
| 8,278,591 | B2 | 10/2012 | Chouf et al. | |
| 8,818,536 | B2 | 8/2014 | Mienhardt et al. | |
| 10,675,708 | B2 | 6/2020 | Bea et al. | |
| 11,052,489 | B2 | 7/2021 | Mizoguchi et al. | |
| 11,458,574 | B2 | 10/2022 | Speker et al. | |
| 11,517,978 | B2 | 12/2022 | Hesse et al. | |
| 2002/0030041 | A1 | 3/2002 | Virtanen et al. | |
| 2012/0012570 | A1* | 1/2012 | Briand | B23K 26/38 219/121.72 |
| 2012/0024831 | A1* | 2/2012 | Briand | B23K 26/123 219/121.72 |
| 2015/0174701 | A1 | 6/2015 | Briand et al. | |
| 2016/0082545 | A1 | 3/2016 | Kurokawa et al. | |
| 2019/0240786 | A1* | 8/2019 | Mach | B23K 26/0876 |

FOREIGN PATENT DOCUMENTS

| | | | |
|---|---|---|---|
| DE | 102016215019 | A1 | 10/2016 |
| DE | 102016220807 | B3 | 3/2018 |
| EP | 0696493 | A1 | 2/1996 |
| EP | 1797988 | A1 | 6/2007 |
| EP | 2105815 | A1 | 9/2009 |
| JP | H07195186 | A | 8/1995 |
| JP | 2017109238 | A | 6/2017 |
| WO | 2018068853 | A1 | 4/2018 |

* cited by examiner

LASER CUTTING METHOD

CROSS-REFERENCE TO RELATED APPLICATION

This application is a continuation, under 35 U.S.C. § 120, of copending International Patent Application PCT/EP2021/075299, filed Sep. 15, 2021, which designated the United States; this application also claims the priority, under 35 U.S.C. § 119, of German Patent Application DE 10 2020 212 088.9, filed Sep. 25, 2020; the prior applications are herewith incorporated by reference in their entirety.

FIELD AND BACKGROUND OF THE INVENTION

The invention relates to a method for laser fusion cutting a workpiece, in particular a plate-shaped workpiece, wherein a laser beam and a cutting gas, in particular nitrogen, at a cutting gas pressure are directed at the workpiece surface by a convergent cutting nozzle, and wherein the laser power is at least 6 kW.

In the case of laser fusion cutting, the material of the workpiece is melted to form a kerf and is evacuated in liquid form from the kerf by means of a cutting gas. The workpiece may be a sheet, in particular a metal and/or electrically conductive sheet. During laser fusion cutting, the laser beam and the workpiece are moved relative to one another along a (generally variable) cutting direction, wherein the kerf in the workpiece is formed counter to the cutting direction.

The properties of the cutting gas jet emerging from the nozzle can influence the quality of the kerf. It is therefore known to influence the cutting gas jet by way of the shape of the nozzle and the cutting gas pressure.

Published, non-prosecuted German patent application DE 102016215019 A1, corresponding to U.S. Pat. No. 10,675,708, discloses a fusion cutting method with a convergent nozzle, in the case of which method the cutting gas has a cutting gas pressure of at most 10 bar, the nozzle has an opening diameter of at least 7 mm, and in the case of which method the distance between the nozzle end face and the workpiece surface is 0.5 mm, in order to minimize the consumption of cutting gas. This method achieves high cutting speed along with good quality of the cutting edges. However, this cutting process is very susceptible to the nozzle colliding with tilted workpiece parts, in particular owing to the small distance between the nozzle and the workpiece surface.

International patent disclosure WO 2018068853 A1, corresponding to U.S. Pat. No. 11,458,574, describes a laser cutting method with a Laval nozzle, in the case of which method workpieces with a thickness of 1 to 4 mm are cut at a cutting gas pressure of between 8 and 23 bar and a distance between the nozzle and the workpiece surface of between 3 and 6 mm. Owing to the large dimensions of the Laval nozzle, this cutting process also runs an increased risk of collision.

SUMMARY OF THE INVENTION

An object of the invention is to propose a laser fusion cutting method that enables high productivity along with reduced risk of collision, i.e. higher process reliability.

This object is achieved according to the invention by a method according to the independent patent claim.

According to the invention, the cutting nozzle has a nozzle end face on the workpiece side, the distance A between the nozzle end face and the workpiece surface during the cutting operation, preferably throughout the cutting process (that is to say even during phases in which the laser is switched off, for example in the course of an on-the-fly puncturing operation) is 2 to 8 mm, in particular has a value between 4 mm and 8 mm. Further, according to one example, the distance A between the nozzle end face and the workpiece surface can be between 3 mm and 4 mm. Furthermore, according to the invention the cutting nozzle has a nozzle channel with a diameter $d_D$ at the nozzle end face on the workpiece side of 1.5 to 4 mm, in particular 2 to 3.3 mm, preferably 2 to 2.7 mm or 3 to 3.3 mm. The nozzle end face is that end face of the nozzle that is directed towards the workpiece during the cutting process. According to the invention, a cutting gas pressure before emergence from the cutting nozzle of 15 to 30 bar is used. For example, the cutting gas pressure before emergence from the cutting nozzle can be between 22 bar and 24 bar.

In the case of the method according to the invention, a convergent nozzle, that is to say a nozzle having a nozzle channel that tapers in the flow direction, is used. The outlet cross section (nozzle diameter at the nozzle end face on the workpiece side) is therefore at the same time also the smallest cross section of the nozzle channel. Owing to the small nozzle channel cross section and the shape of the nozzle channel, it is possible to use a compact nozzle for the method according to the invention, this in turn resulting in a small disrupting contour and thus a reduced risk of collision.

At the same time, according to the invention the process distance (distance between the nozzle end face on the workpiece side and the workpiece surface) is selected as relatively large (2-8 mm). This further reduces the risk of collision. In addition, it is ensured that the kerf is sufficiently covered by gas in spite of the small cross section of the nozzle channel.

The process distance according to the invention is compensated by the use of a correspondingly large cutting gas pressure (15 to 30 bar).

The overall result of the method according to the invention is a very small disrupting contour of the cutting nozzle and a small risk of collision, so that the process reliability is increased. The method according to the invention makes it possible to carry out a fusion cutting method at high cutting speeds (advancement speed of the cutting nozzle relative to the workpiece during the cutting operation), even in the case of large workpieces.

In a preferred variant, the distance between the nozzle end face and the workpiece surface is maintained throughout the cutting process. Adjustment of the distance during the cutting process can therefore be dispensed with, this further increasing the productivity of the overall process.

In a special variant of the method according to the invention, the cutting nozzle used is a single-channel nozzle or an annular die. This makes it possible to reduce the disrupting contour and the consumption of gas.

Preferably, the cutting gas pressure before emergence from the cutting nozzle is more than 18 bar, in particular at least 20 bar. In a special variant, the cutting gas pressure is at least 24 bar.

In a particularly preferred variant, the cutting nozzle is moved relative to the workpiece at least at times at a cutting speed of at least 60 m/min. In this respect, the cutting speed is denoted by the maximum advancement speed during the cutting operation (that is to say with the laser beam directed at the workpiece).

In a special variant, the focal position of the laser is selected such that it lies on the workpiece surface or in the workpiece half facing towards the cutting nozzle, in particular lies between 0.2 mm-1.5 mm below the top side of the sheet. The highest cutting speed can be reached in this focal position range.

The laser power during the cutting operation is preferably at least 10 kW. Owing to the high laser power used in the method according to the invention, it is possible to process thick workpieces. The method according to the invention can thus particularly advantageously be carried out on workpieces with a workpiece thickness D of at least 4 mm.

A particularly preferred variant of the method according to the invention provides that the laser beam punctures the workpiece surface at least at one puncture point while the cutting nozzle is being moved relative to the workpiece (on-the-fly puncturing operation). Such a process variant is primarily used whenever many small workpiece parts that are arranged in a line and have straight contour portions are to be cut. In the process, a laser cutting head with the cutting nozzle is moved linearly over the workpiece (or vice versa), and the laser beam (with cutting parameters) is switched on and off so that the puncturing operation takes place during the relative movement between the cutting nozzle and the workpiece (that is to say "on-the-fly").

In the case of workpieces with a thickness of more than 4 mm, however, even at a laser power between 10 and 20 kW, the on-the-fly puncturing operation is not possible with good quality, since a clean puncture and start of the cut cannot be achieved at the desired cutting speeds. This problem can be solved by reducing the advancement speed at the puncture point, given otherwise unchanged process parameters. A special variant of the method according to the invention therefore provides that the advancement speed is reduced to a puncture speed, preferably by 10%-90% of the cutting speed, at the puncture point.

Preferably, the advancement speed is reduced to the puncture speed over a displacement distance of less than 2 mm, preferably less than 0.5 mm, in such a way that the puncture speed is reached at the puncture point. Reducing the advancement speed is thus commenced at most 2 mm upstream of the puncture point (in the advancement direction). In this way, it is ensured that, on the one hand, the speed is reduced with viable acceleration, and, on the other hand, the necessarily acceptable loss of time is not excessive. The advancement speed is reduced with the laser switched off.

Preferably, after the laser beam punctures the workpiece surface, the puncture speed is maintained for a few milliseconds and then the advancement speed is increased back up to the cutting speed.

Further advantages of the invention are evident from the description and the drawing. Similarly, according to the invention, the features mentioned above and those still to be further presented can be used in each case individually or together in any desired combinations. The embodiments shown and described should not be understood as an exhaustive enumeration, but rather are of an exemplary character for outlining the invention.

Other features which are considered as characteristic for the invention are set forth in the appended claims.

Although the invention is illustrated and described herein as embodied in a laser cutting method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In the following description of the figures, identical reference signs are used for identical or functionally identical components.

Figure 1:
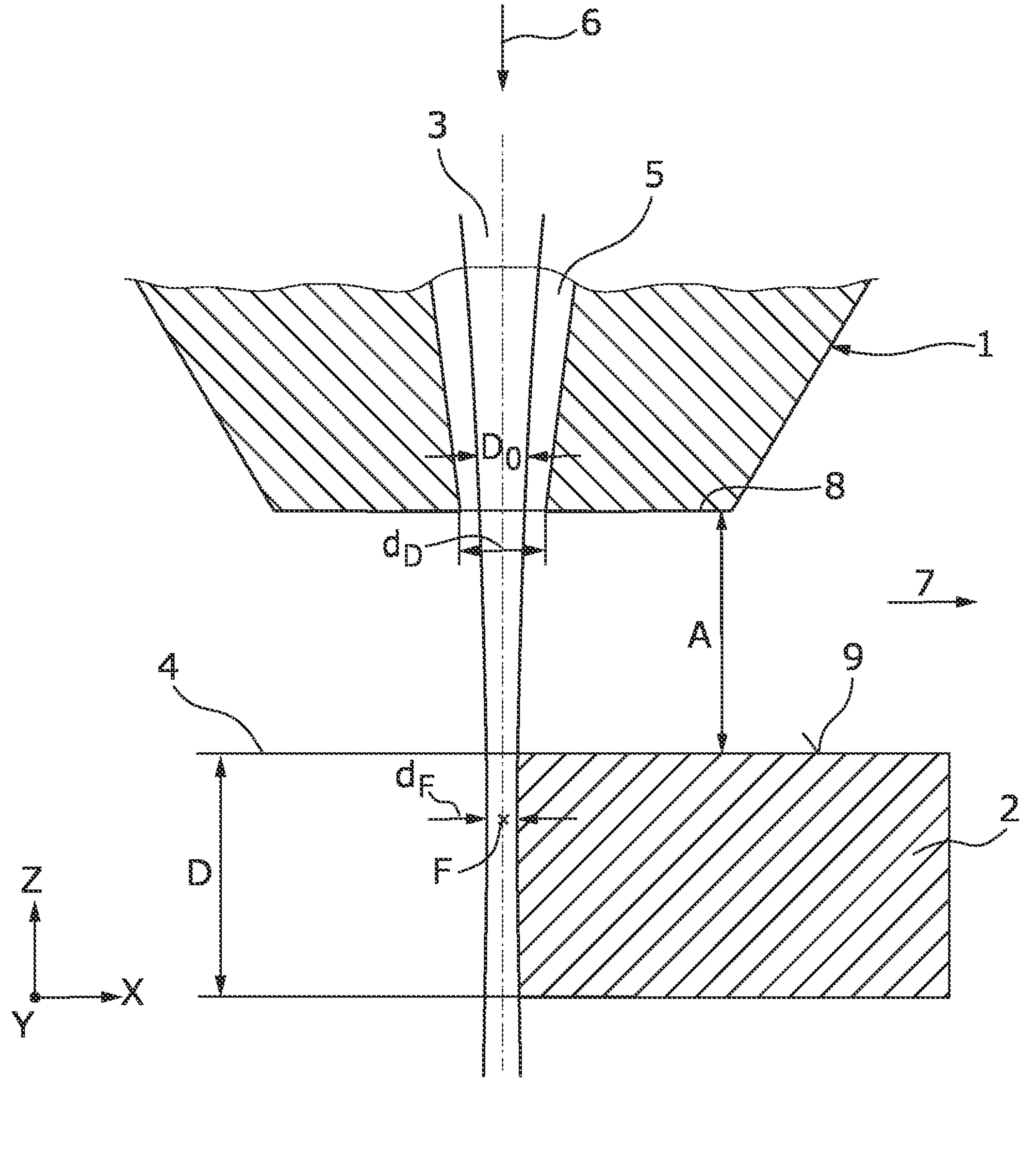
FIG. 1 is a diagrammatic, longitudinal section view through a cutting nozzle and through a plate-shaped workpiece during the laser fusion cutting operation.
Figure 4:
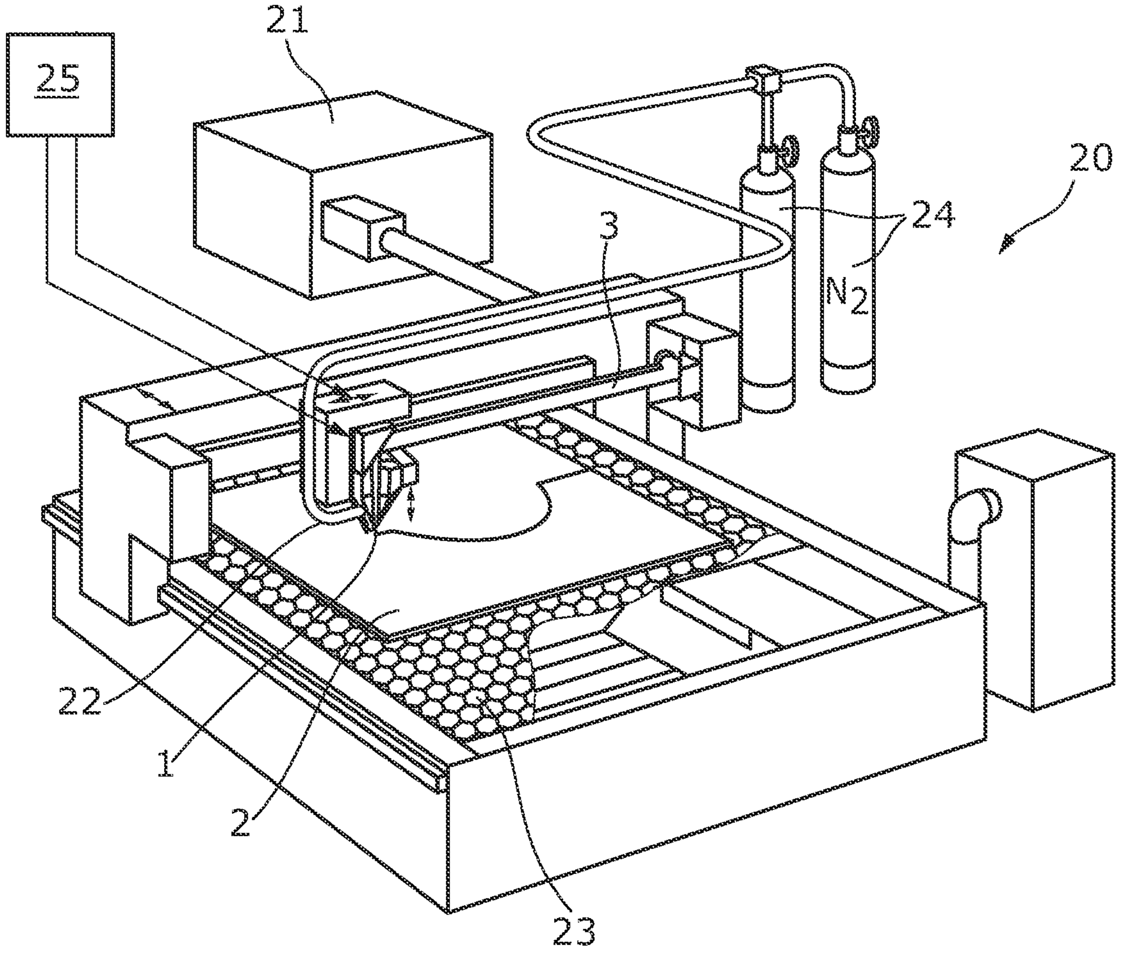
FIG. 4 is a perspective view of a laser cutting machine for carrying out the laser fusion cutting method according to the invention.

Referring now to the figures of the drawings in detail and first, particularly to FIG. 1 thereof, there is shown a convergent cutting nozzle 1 for laser cutting a plate-shaped metal workpiece 2 (a sheet) with a thickness D by means of a laser beam 3 and a cutting gas 24 (cf. FIG. 4). The cutting nozzle 1 contains a nozzle channel 5, which has a relatively small diameter $d_D$ of 1.5 to 4 mm at a nozzle end face 8 on the workpiece side. The cutting gas 24 and the laser beam 3 both emerge together from the nozzle channel 5 of the cutting nozzle 1. The laser beam 3 has a beam direction 6 which runs in the negative Z direction of an XYZ coordinate system. In the present case, the laser cutting process is a fusion cutting process, which makes use of nitrogen as the cutting gas 24.

According to the invention, a distance A between the nozzle end face 8 on the workpiece side and the workpiece surface 9 facing towards the cutting nozzle 1 is at least 2 mm, preferably at least 4 mm, in particular up to 8 mm. According to the invention, a focal position F of the laser beam 3 in the beam direction 6 is located within the thickness D of the workpiece 2, in the upper half of the workpiece 2 that faces towards the cutting nozzle 1 or on the workpiece surface 9 (the latter not being shown). Expressed differently, the focal position F of the laser beam 3 in the beam direction 6 is located in the workpiece 2 at a depth that is less than half D/2 of the thickness D of the workpiece 2.

The cutting nozzle 1 is moved over the workpiece 2 at a cutting speed in a cutting direction 7, which corresponds to the X direction of the XYZ coordinate system, in order to produce a kerf 4 in the workpiece 2.

Figure 2:
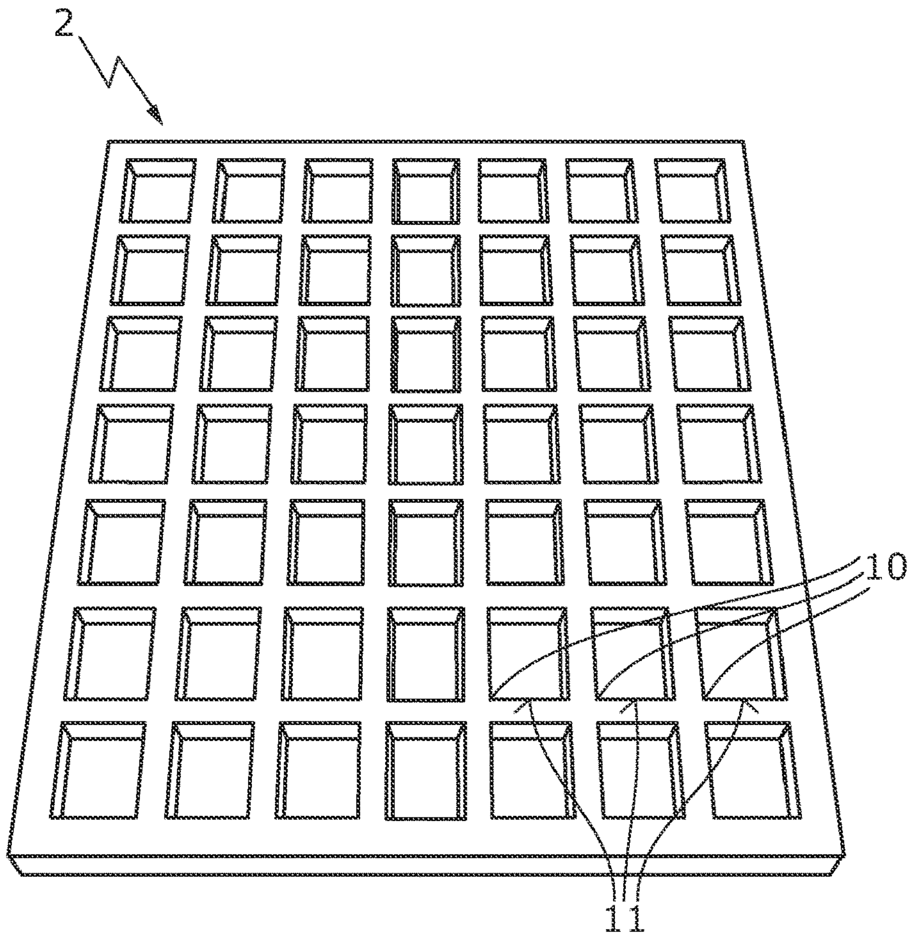
FIG. 2 is a perspective view of a workpiece with a multiplicity of cut contour portions that has been processed on-the-fly.

FIG. 2 shows a workpiece 2 with many straight contour portions 11 (edges of a square) arranged in a line. To fusion cut such contours, at the start of each contour portion 11 the laser beam 3 punctures the workpiece surface 9 at a puncture point 10. To that end, the laser beam 3 is switched on at the puncture point 10 of the respective contour portion 11, moved along the contour portion 11 and switched off at the end of the contour portion 11.

When this operation is to be carried out on-the-fly, that is to say without stopping the cutting nozzle 1 at the puncture point 10, in the case of thick workpieces 2 it is advantageous to reduce the advancement speed of the cutting nozzle 1 upstream of the puncture point 10 (in the cutting direction). To that end, a laser cutting head with the cutting nozzle 1 is continuously moved linearly over the workpiece 2, wherein the advancement speed is reduced upstream of the puncture points 10 and increased back up again downstream of the puncture points 10.

Figure 3:
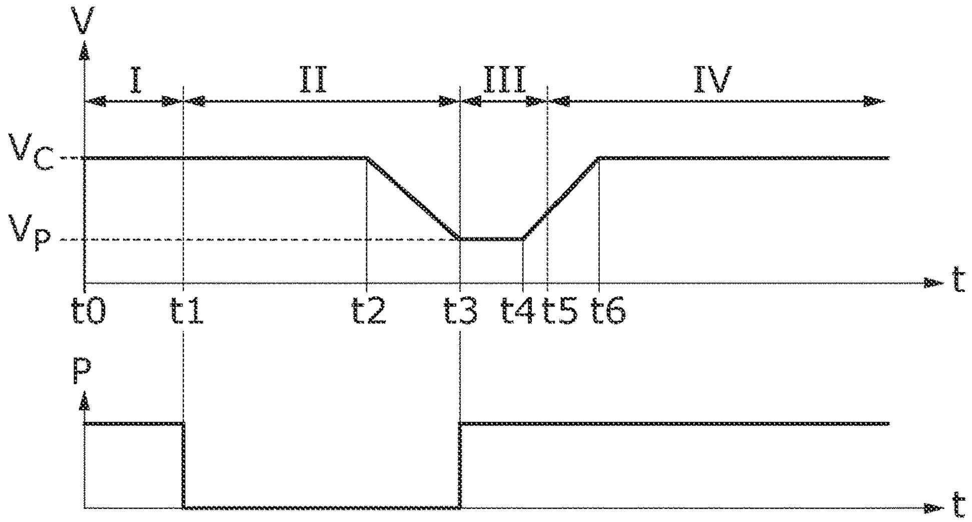
FIG. 3 is a graph showing a change over time of an advancement speed and of laser power in a vicinity of a puncture point during the on-the-fly puncturing operation.

FIG. 3 shows a possible sequence for adjusting the advancement speed and the corresponding laser power during the on-the-fly puncturing operation. The cutting speed $v_C$ can be, for example, 14.5 m/min at a laser power of 10 kW, and, for example, 25 m/min at a laser power of 20 kW. After the cutting I of a first contour portion 11 in the period of time t0 to t1, with the laser beam 3 switched on and the cutting speed $v_C$ as advancement speed, in order to subsequently position II the cutting nozzle 1 the cutting speed $v_C$ of the cutting nozzle 1 is first of all maintained (period of time t1 to t2). Just upstream of the next puncture point 10, the advancement speed of the cutting nozzle is reduced to a puncture speed $v_P$ for a period of time t2 to t3. When cutting construction steel with a workpiece thickness of 5 mm using a laser power of 10 kW, the puncture speed can be, for example, approximately 5 m/min, and using a laser power of 20 kW, the puncture speed can be, for example, approximately 10 m/min. The point in time t2 is preferably selected such that the distance between the point at which the reduction in the advancement speed is commenced (position of the cutting nozzle 1 at the point in time t2) and the next puncture point is at most 2 mm, preferably at most 0.5 mm. At the point in time t3, the cutting nozzle 1 reaches the puncture point at the puncture speed $v_P$ and the laser beam is switched on again to puncture the workpiece 2. The puncturing operation III takes place in the period of time t3 to t5. During the puncturing operation III, the puncture speed $v_P$ should be maintained preferably for as short as possible a time (period of time t3 to t4). After that, the advancement speed of the cutting nozzle 1 is increased back up to the cutting speed $v_C$ within the period of time t4 to t6. At the point in time t5, the puncturing operation III has ended, i.e. the laser beam has penetrated through the entire thickness of the workpiece. At the point in time t6, the cutting speed $v_C$ is reached again and the contour portion 11 can be fully cut at the cutting speed $v_C$. The advancement speed is preferably reduced and increased linearly.

FIG. 4 shows a laser cutting machine 20 that is suitable for carrying out the laser fusion cutting method described above.

The laser cutting machine 20 comprises, for example, a solid-state laser or a diode laser as laser beam generator 21. The laser cutting machine 20 further has a displaceable (laser) cutting head 22, together with which the cutting nozzle 1 is moved, and a workpiece rest 23, on which the workpiece 2 is arranged. The laser beam 3 which is guided from the laser beam generator 21 to the cutting head 22 is generated in the laser beam generator 21. The laser beam 3 is directed at the workpiece 2 by means of a focusing optical unit arranged in the cutting head 22.

Moreover, the laser cutting machine 20 is supplied with cutting gas 24, in this instance nitrogen. To carry out the laser fusion cutting method according to the invention that is described above, nitrogen as cutting gas 24 is supplied to the cutting nozzle 1 of the cutting head 22, to be precise at an overpressure of approximately 15-30 bar (before the emergence of the cutting gas 24 from the cutting nozzle 1).

Further, the laser cutting machine 20 contains a machine controller 25 which is programmed to move the cutting head 22, together with its cutting nozzle 1, relative to the stationary workpiece 2 in accordance with a cutting contour. The machine controller 25 also controls the power of the laser beam generator 21, which is more than 6 kW and in particular is more than 10 kW in the case of the fusion cutting process described above. In this way, for example, given a workpiece thickness of 1.5 mm at 6 kW, a cutting speed (advancement) of 60 m/min or even higher can be reached, with the cutting speed increasing as the laser power increases.

The following is a summary list of reference numerals and the corresponding structure used in the above description of the invention.

LIST OF REFERENCE SIGNS

1 Cutting nozzle
2 Workpiece
3 Laser beam
4 Kerf
5 Nozzle channel
6 Beam direction of the laser beam
7 Cutting direction
8 Nozzle end face
9 Workpiece surface
10 Puncture points
11 Contour portion
20 Laser cutting machine
21 Laser beam generator
22 Cutting head
23 Workpiece rest
24 Cutting gas
25 Machine controller
F Focal position
D Workpiece thickness
A Distance
$d_F$ Laser beam diameter
$d_D$ Nozzle channel diameter

The invention claimed is:

1. A method for laser fusion cutting a workpiece, which comprises the steps of:

directing a laser beam and a cutting gas at a cutting gas pressure at a workpiece surface by means of a convergent cutting nozzle, the convergent cutting nozzle having a nozzle end face on a workpiece side;

setting a laser power to be at least 6 KW;

setting a distance between the nozzle end face and the workpiece surface during the laser fusion cutting to be 2 to 8 mm;

setting a diameter of a nozzle channel of the convergent cutting nozzle at the nozzle end face on the workpiece side to be 1.5 to 4 mm;

setting the cutting gas pressure before emergence from the convergent cutting nozzle to be 15 to 30 bar;

advancing the convergent cutting nozzle towards at least one puncture point on the workpiece surface at an advancement speed;

at a predetermined displacement distance upstream of the puncture point, reducing the advancement speed to a puncture speed lower than the advancement speed, such that the convergent cutting nozzle reaches the at least one puncture point at the puncture speed;

puncturing the workpiece surface with the laser beam at the at least one puncture point.

2. The method according to claim 1, which further comprises maintaining the distance between the nozzle end face and the workpiece surface throughout a cutting process.

3. The method according to claim 1, which further comprises providing a single-channel nozzle or an annular die as the convergent cutting nozzle.

4. The method according to claim 1, wherein the cutting gas pressure before emergence from the convergent cutting nozzle is more than 18 bar.

5. The method according to claim 1, which further comprises moving the convergent cutting nozzle relative to the workpiece at least at times at a cutting speed of at least 60 m/min.

6. The method according to claim 1, wherein a focal position of the laser beam lies on the workpiece surface or in a workpiece half facing towards the convergent cutting nozzle.

7. The method according to claim 1, which further comprises setting the laser power during a cutting operation to be at least 10 kW.

8. The method according to claim 1, which further comprises carrying out the method on workpieces with a workpiece thickness of at least 4 mm.

9. The method according to claim 1, wherein the laser beam punctures the workpiece surface at the least at one puncture point while the convergent cutting nozzle and the workpiece are being moved relative to one another.

10. The method according to claim 1, which further comprises reducing the advancement speed to the puncture speed over a displacement distance of less than 2 mm with a result that the puncture speed is reached at the at least one puncture point.

11. The method according to claim 1, wherein after the laser beam punctures the workpiece surface, the puncture speed is maintained for a few milliseconds and then the advancement speed is increased back up to a cutting speed.

12. The method according to claim 1, wherein:

the workpiece is a plate-shaped workpiece;

the cutting gas is nitrogen; and the distance between the nozzle end face and the workpiece surface during the laser fusion cutting is 4 to 8 mm.

13. The method according to claim 1, wherein a focal position of the laser beam lies on the workpiece surface or in a workpiece half facing towards the convergent cutting nozzle and lies between 0.2 mm and 1.5 mm below a top side of the workpiece.

14. The method according to claim 1, which further comprises reducing an advancement speed to the puncture speed, by 10%-90% of a cutting speed, at the at least one puncture point.

15. The method according to claim 1, which further comprises reducing the advancement speed to the puncture speed over a displacement distance of less than 0.5 mm, with a result that the puncture speed is reached at the at least one puncture point.

* * * * *